United States Patent
Nitzsche et al.

[11] Patent Number: 6,164,830
[45] Date of Patent: Dec. 26, 2000

[54] PENDULUM SLIDING BEARING

[75] Inventors: Hartmut Nitzsche, Buehl; Heinz Seibert, Achern; Gerald Kuenzel, Buehl; Oliver Jung, Wuppertal; Hans-Peter Seebacher, Baden-Baden; Bernd Wieland, Gaggenau; Peter Litterst, Achern; Hansjuergen Linde, Coburg; Uwe Neumann, Bamberg, all of Germany

[73] Assignee: Robert Boosch GmbH, Stuttgart, Germany

[21] Appl. No.: 09/358,294

[22] Filed: Jul. 21, 1999

[30] Foreign Application Priority Data

Jul. 29, 1998 [DE] Germany .......................... 198 33 982

[51] Int. Cl.$^7$ ...................................................... F16C 23/04
[52] U.S. Cl. ........................... 384/203; 384/192; 384/204; 384/206
[58] Field of Search ............................ 384/192, 202–204, 384/206, 208–210, 213, 214; 310/90

[56] References Cited

U.S. PATENT DOCUMENTS

| | | | |
|---|---|---|---|
| 3,034,838 | 5/1962 | Abel | 384/214 |
| 3,754,802 | 8/1973 | Keller | 384/203 |
| 4,806,025 | 2/1989 | Kamiyama et al. | 384/202 |
| 4,887,916 | 12/1989 | Adam et al. | 384/192 |
| 4,910,788 | 3/1990 | Shimizu | 384/192 |
| 4,924,127 | 5/1990 | Boireau et al. | 310/90 |
| 5,360,274 | 11/1994 | Strobl | 384/192 |
| 5,455,471 | 10/1995 | Dowell | 310/90 |

FOREIGN PATENT DOCUMENTS 1 078 378   3/1960   Germany .

*Primary Examiner*—Thomas R. Hannon
*Attorney, Agent, or Firm*—Michael J. Striker

[57] ABSTRACT

A pendulum sliding bearing has a sliding bearing bushing provided for receiving a rotatable elements, such as shafts, axles and the like, the sliding bearing bushing having calotte portions at end sides, a bearing body formed of a metal plate and having a ring-shaped abutment surface for one of the calotte portions of the sliding bearing bushing, a wall extending substantially outwardly of the abutment surface, and a casing adjoining the wall and provided for insertion in a cylindrical opening, a spring disk having a central opening and an adjoining at least one second abutment surface for the second calotte portion of the sliding bearing bushing and having a radially outer edge fixed on the bearing body, the casing being subdivided into casing fields which extend substantially parallel to a longitudinal axial of the bearing body so that gaps are available between the casing fields, a plurality of supporting fingers extending at least over a width of the gaps from the wall in a direction opposite to a course of the casing.

9 Claims, 2 Drawing Sheets

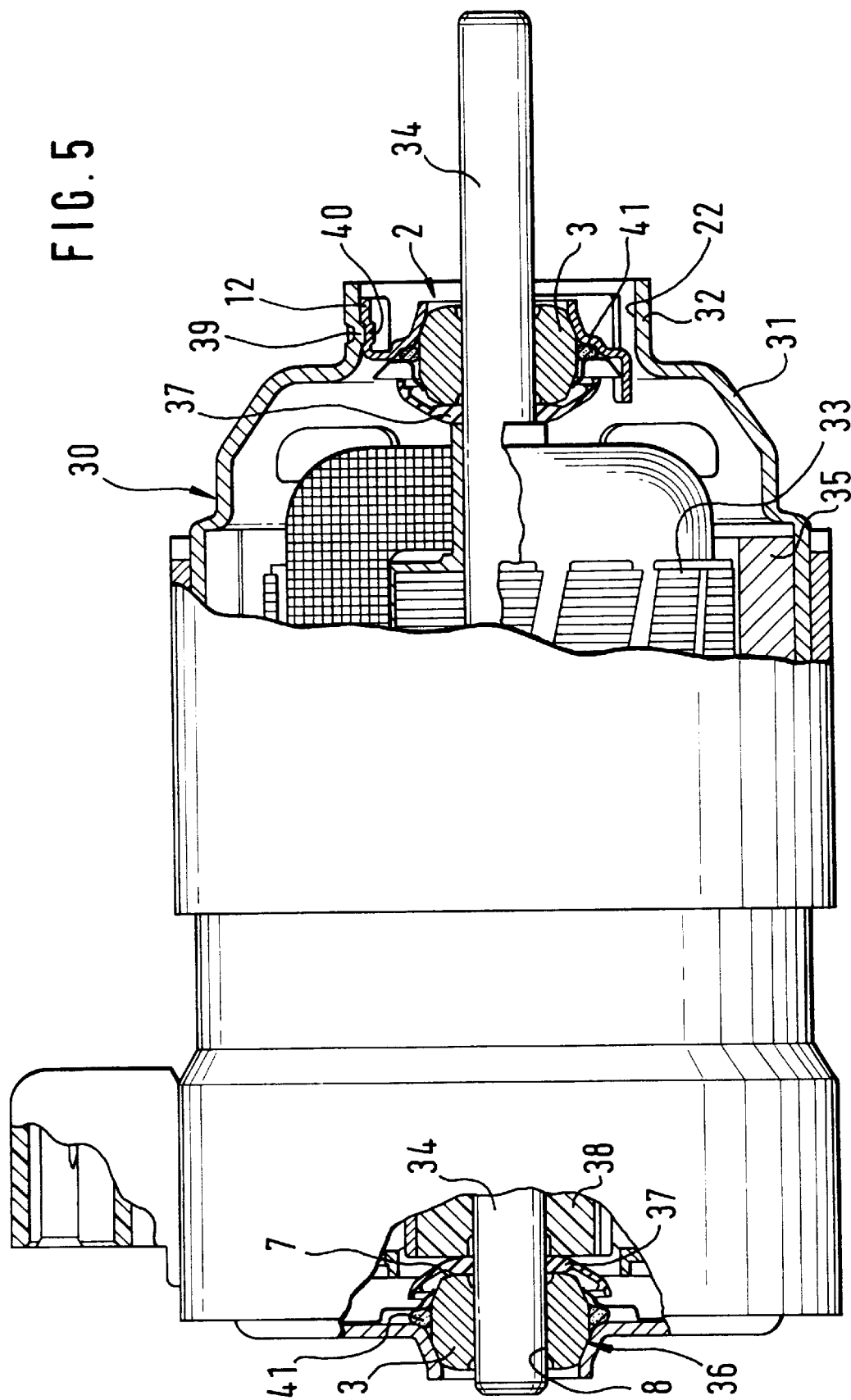

PENDULUM SLIDING BEARING

BACKGROUND OF THE INVENTION

The present invention relates to a pendulum sliding bearing.

U.S. Pat. No. 3,754,802 discloses a pendulum sliding bearing, which has an outer calotte-like shaped sliding bearing bushing and a bearing body composed of a metal plate and determined in accordance with a pendulum-moving receptacle of the sliding bearing bushing. The bearing body has a central opening and adjoining ring-shaped abutment surface for a first calotte-like zone of the sliding bearing bushing, a wall located radially outwardly of the abutment surface, and the casing strips which extend from the wall and are substantially perpendicular. They are used for abutment and fixation of a bearing body located in a cylindrical opening and determining of at least a part of its length a surrounding component and gaps between the casing stripes. Springy tongues extend from the wall and are oriented toward the gaps so as to abut with free springy ends against the sliding bearing bushing. As indicated with the expression "substantially rectangular" the casing strips can have a slightly conical orientation before the introduction into the above mentioned component, so that with the introduction the casing surfaces abut springy in the cylindrical opening. It requires a special attention during the manufacture of the bearing body so that later on under the action of the springy tongues the sliding bearing bushing abuts without a gap against the ring-shaped abutment surface and despite this is pendulum-movable sufficiently in a desired manner.

The German patent document 1,078,378 discloses a pendulum sliding bearing with a sliding bearing bushing, which is outwardly calotte-shaped and has a bearing body which is deep-drawn from metal plate, a central opening, and a ring-shaped abutment surface for a first calotte-shaped zone of the sliding bearing bushing, an adjoining substantially radially outwardly extending wall, a substantially cylindrical casing adjoining the wall and arranged with a radial distance around the sliding bearing bushing, and a spring disk provided with an abutment surface oriented against a second calotte-like zone of the sliding bearing bush and having a radially outer edge which is embraced by a flange provided on the bearing body for fixing the spring disk. The pendulum sliding bearing is composed of two components, while the bearing body is deep drawn from a well drawable metal plate, and the spring disk is produced independently from the bearing body in a relatively simple manner, since it is punched out as a ring disk from a spring metal plate, and the support of the abutment surface which serves as a sliding bearing bush is relatively simple and can be shaped when necessary conical or spherical. Because of the formation of the spring disk, all three components of the pendulum bearing must be produced with high size accuracy, so that after the flanging of the spring disk along its outer edge the sliding bearing bushing is retained without a gap but nevertheless is pendulum-movable against a resistance which is not too high. For a fixed seat inside a cylindrical opening of a surrounding component, the casing is formed somewhat conical. Therefore the bearing body can be inserted easily in the cylindrical opening and rigidly fixed after pressing in it. The flanging of the spring disk limits the pressing-in depth of the bearing body. This pendulum sliding bearing is for example a component of a small electrical motor.

SUMMARY OF THE INVENTION

Accordingly, it is an object of the present invention to provide a pendulum sliding bearing which avoids the disadvantages of the prior art.

In keeping with these objects and with others which will become apparent hereinafter, one feature of present invention resides, briefly stated, in a pendulum sliding bearing in which the casing is subdivided in casing fields extending substantially parallel to a longitudinal axis of the bearing body, gaps between the casing fields are available, and the supporting finger projects from the wall at least over the width of the gaps in a direction opposite to the course of the casing surfaces, and the spring disk is held with its outer edge outside the supporting finger.

When the pendulum sliding bearing is designed in accordance with the present invention, it has the advantage that its bearing body can be produced from well drawable metal plate which is producible independently from the spring disk, and during assembly of the pendulum bearing by clamping with jointing is held inside the bearing body, and a flanging which was performed in accordance with the prior art is superfluous.

In accordance with another feature of present invention, the three casing fields project from the wall in an axial direction, and three supporting fingers which are offset by a rotary angle are provided. This construction provides a simple embodiment, which is easily centerable in the cylindrical opening of a surrounding component.

In accordance with still a further feature of the present invention, the supporting fingers are located inside of a contour circle whose diameter is smaller than a diameter of a contour circle at which the casing fields end. When the pendulum sliding bearing is designed in accordance with the present invention, it has the advantage that the bearing is placed with a corresponding end side before the spring disk, from which it is easily insertable in the cylindrical opening of the surrounding component, and then under a force application and therefore elastic or plastic deformation of the casing surfaces, a fixation of the bearing body in the surrounding component takes place. It is therefore the advantage that during the use of the swinging sliding bearing as an axial bearing, with the utilization of an end surface of the sliding bearing bushing the bearing body is steplessly pressable-in for adjusting of axial gap, for example the armature shaft of an electric motor or a transmission shaft relative to a second axial sliding bearing.

In accordance with still another feature of present invention the spring disk has a funnel-like projection extending in an orientation direction toward the supporting fingers, and the projection is open toward the free ends of the supporting fingers and has an edge. There is therefore a possibility to fix the spring disk in a technically simple manner in the bearing body. It suffices for this, when after the insertion of the sliding bearing bushing into the bearing body the spring disk is oriented relative to the sliding bearing bushing and therefore is moved against the wall of the bearing body and brought in abutment for example against this wall. Therefore the spring disk can take up an axial force which is applied by the sliding bearing bushing opposite to the mounting direction of the spring disk, since the funnel-shaped edge region of the spring disk is located in abutment against the supporting fingers of the bearing body in a gap direction and can be claw-shaped.

In accordance with still further feature of the present invention, the bearing body is pressed into a cylindrical opening of a housing part of a device, such as an electric motor, a transmission and the like, and at least one casing field is welded with the housing part. In this construction, the pendulum sliding bearing is a component of a structural group and is secured inside it with self-substance.

In accordance with still a further feature of present invention, the housing part which extends around the casing surfaces of the bearing body is formed as a tube-like projections and the welding is formed as a point welding. This construction has the advantage that the self-substance connection of the bearing body of the pendulum swinging bearing with the structural group can be produced in a technically simple manner.

In accordance with another feature of the present invention, the cylindrical opening is formed in the bearing body as a tubular projection as a housing part of a device, such as for example electric motor or transmission and they are pressed in the tubular projection and in at least one projection which forms the casing field of the form-locking securing element. In such a construction, a form-locking fixation is produced, which in an advantageous manner can be formed in cold process which makes possible assembly of the bearing body in a structural group.

Finally, the casing surfaces of the bearing body can be glued with the cylindrical opening. In this construction an alternative type of an additional fixation of the bearing body is provided. For this purpose the adhesive for example is used, which is known for glueing the bearing bushings in the machine parts.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing the inventive pendulum sliding bearing of FIG. 1 in a mounted condition as a component of a structural group.

DESCRIPTION OF PREFERRED EMBODIMENTS

Figure 1:
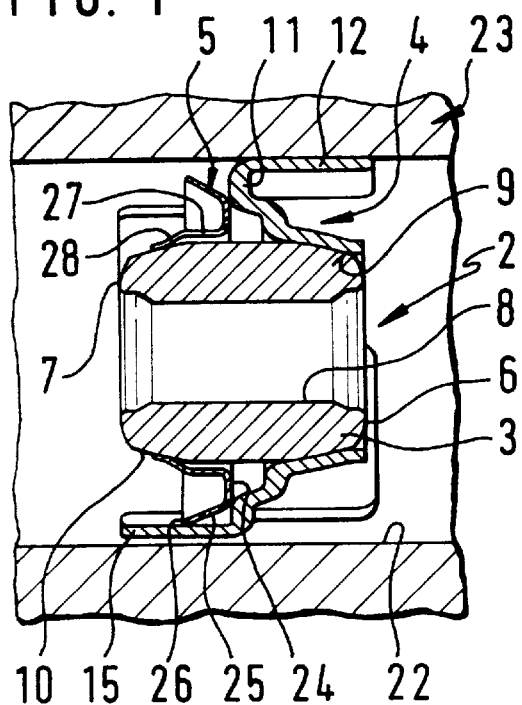
FIG. 1 is a view showing a longitudinal section of a pendulum sliding bearing in accordance with the present invention.
Figure 4:
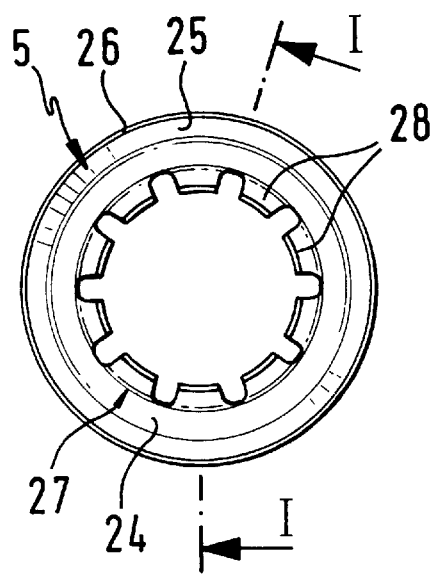
FIG. 4 is a view showing a further component of the inventive pendulum sliding bearing in an end view.

A pendulum sliding bearing in accordance with present invention is identified as a whole with reference numeral 2 in FIG. 1. It has a sliding bearing bushing 3, a bearing body 4, and a spring disk 5.

The sliding bearing bushing 3 has a first end side 6 and a second end side 7, a bearing opening 8, a first calotte portion 9 located at the first end side 6, and a second calotte-like portion 10 located near the second end side 7. The sliding bearing bushing 3 is for example pressed of iron powder and sintered, and its bearing opening 8 is calibrated. The sliding bearing bushing 3 is impregnated for example with lubricant in a known manner.

Figure 2:
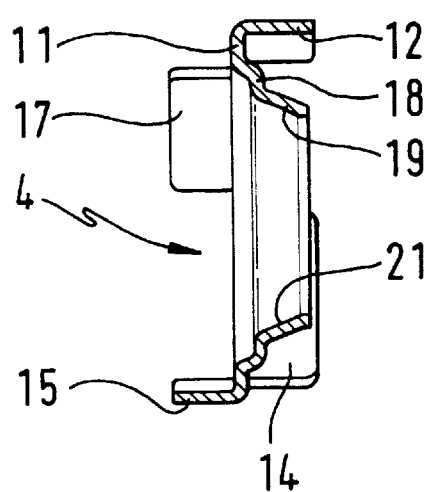
FIG. 2 is a view showing a component of the inventive sliding bearing also in a longitudinal section.
Figure 3:
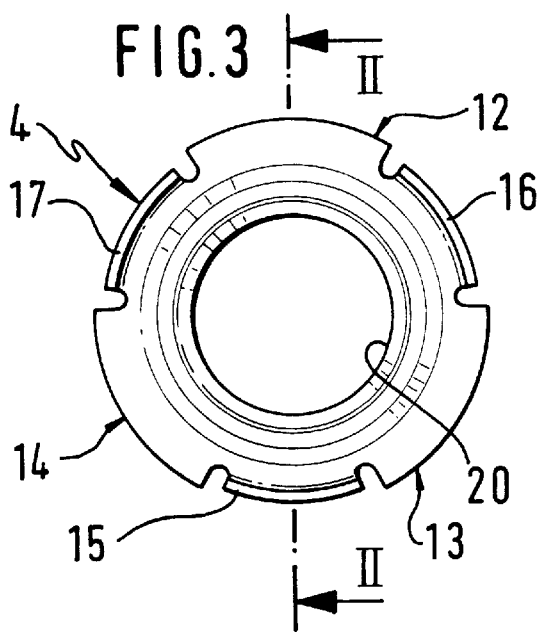
FIG. 3 is a view showing a component of FIG. 2 on an end view.

The bearing body 4 has a wall 11 which is substantially ring-shaped and extends transversely to an imaginary longitudinal axis of the bearing body 4. In this embodiment three casing fields 12, 13, 14, extend from this wall as shown in FIGS. 2 and 3 and therefore are substantially parallel to the above mentioned reference axis. The casing fields 12–14 extend over substantially 60° in a peripheral direction. In FIG. 1 and in FIG. 2 the casing fields are oriented to the right from the wall 11. In contrast, three supporting fingers 15, 16, 17 extend to the left as shown in FIG. 3. The extension of these supporting fingers in the circumferential direction is for example smaller than the extension in the circumferential direction of the casing springs 12–14. For corresponding manufacture, as can be seen from FIG. 3, the not identified gaps between the casing springs 12–14 and the supporting fingers 15–17 are provided.

The reason for this is that the supporting body 4 is produced from a preform which is punched from a metal plate and is star-shaped. Radially inwardly of the ring-like extending wall 11, also a substantially ring-shaped transition 18 and a bearing neck 19 adjoining it and extending radially inwardly are formed on the above mentioned preform. The bearing neck 19 has a central opening 20 as can be seen from FIG. 3. A first abutment surface 21 is located inside the bearing neck 19 as can be seen from FIG. 2. In correspondence with the first calotte portion 9 of the sliding bearing bushing 3, the first abutment surface 21 is curved spherically and in this example is formed as uninterrupted ring-shaped element.

As can be seen from FIG. 3 and also from FIG. 1, the casing fields 12, 13, 14 limit a contour circle which is greater than a contour circle over which the supporting fingers 15, 16, and 17 extend. This is especially clearly shown in FIG. 1, where the casing field 12 is located in a cylindrical opening of a component 23, while to the contrary a radial distance is provided diametrically opposite and also under in FIG. 1 between the supporting finger 15 and the above mentioned cylindrical opening 22. This radial distance makes possible the insertion from the right in FIG. 1, or in other words with the supporting fingers 15, 16, and 17 in a leading orientation, and thereafter the casing fields 12, 13 and 14 come in contact with a cylindrical opening 22. It can be seen that these features facilitate later the mounting of the complete pendulum bearing 2. The spring disk 5 in the shown embodiment has a plane ring-shaped spring disk wall 24. A funnel-shaped projection 25 extends radially outwardly from it and is limited by an edge 26. A tube-like portion 27 extends radially inside the spring disk wall 24 from it in direction of the expansion of the funnel-shaped projection 25. Spring tongues 28 are connected to the tubular portion 27 and formed for abutment against the second calotte portion 10 of the sliding bearing bushing 3. The springy tongues, for example 10 pieces, are arranged with regular angular distances so as to place substantially radially inwardly against the second culotte portion 10 of the sliding bearing bushing 3. In correspondence with the above mentioned number 10, instead a ring-shaped abutment as disclosed in the German document DE AS 1 078 378 with a multiple distributed abutment surface can be available. It should be also mentioned that instead of a ring-shaped abutment surface in accordance with the above mentioned patent document, a plurality of partial abutment surfaces are arranged, which due to the springy tongues 28 are elastically yieldable substantially in a radial direction.

The pendulum sliding bearing 2 is assembled by orienting the sliding bearing bushing 3 toward the longitudinal axis of the bearing body 4 and inserting the first calotte portion 9 into the bearing neck 19 so that it comes to sitting on the first abutment surface 21. When the spring disk 5 is also oriented to the longitudinal axis of the bearing body 4 and is inserted in the axial direction with the spring disk wall 24 and the edge 26 or the springy tongues 28 between the supporting fingers 15, 16, and 17 and for example so far against the wall 11 of the bearing body 4, that the disk wall 24 abuts against the wall 11 of the bearing body 4. The funnel shaped projection 25 of the spring disk 5 is deformed at least in the region of the supporting fingers 15, 16, and 17 radially elastically, so that the edge 26 abuts with the radial pretensioning in the supporting fingers 15, 16, and 17. It can be recognized that for example three available radial forces with consideration of a friction value between the edge 26 and the supporting fingers 15, 16 and 17 for the forces which after the insertion of the spring disk 5 act opposite to the insertion direction on the spring disk, at least operate as braking forces. Since the bearing body 4 is produced of a well deep-drawable metal plate and also a relatively soft material is utilized, and since the spring disk is hardened as understood from its name, there is a possibility that the sharp-edge 26 of the spring disk produced by punching can substantially engage in the supporting fingers 15, 16 and 17. During the above mentioned loading of the spring disk 5, a jointing of the funnel-shaped projection 25 with the supporting fingers 15, 16 and 17 takes place. It can be seen that the spring disk 5 is very well secured against axial deviation from the bearing body 4.

During insertion of the spring disk 5 between the supporting fingers 15, 16 and 17 of the bearing body 4 the springy tongues 28 reach the contact with the second calotte portion 10 of the sliding bearing bushing 3. Thereby the spring tongues 28 are bent elastically radially outwardly from their initial orientation required for the manufacture, so that they abut with desired pressing force against the second calotte portion 10. The pressing forces which are individually distributed over a ring cause an adhesive friction between the springy tongues 28 and the sliding bearing bush 3 and act for securing against undesired rotation of the bearing bushing relative to the bearing body 4. A further adhesive friction which counteracts a relative turning of the sliding bearing bushing 3 relative to the bearing body 4 results from the abutment of the first calotte portion 9 of the sliding bearing bushing 3 against the first abutment surface 21 due to the fact that the spring tongues 28 abut with elastic tensioning against the second calotte portion 10 of the sliding bearing bushing 3 and therefore due to axial components are loaded by the spring forces of the sliding bearing bushing 3 against the first abutment surface 21.

The inventive pendulum sliding bearing 2 is for example a component of an electric motor 30 shown in FIG. 5. The electric motor 30 has for example a cup-shaped housing 31 which extends into a tubular projection 32. A cylindrical opening 22 is available inside the tubular projection 32, which is shown in FIG. 1. The description of the insertion of the pendulum sliding bearing 2 in the housing 31 of the electric motor 30 is presented herein below. In a typical way for the electric motors, the electric motor 30 has an armature 33 which is arranged around an armature shaft 34. Permanent magnets are inserted in a radial distance from the armature, for example in the cup-shaped housing 31, and one permanent magnet 35 is shown in FIG. 5. The armature shaft 34, to the right of the armature 33 in FIG. 5, is supported at the one side in the inventive pendulum sliding bearing 2 and on the other side in a further pendulum sliding bearing 36 which also has a spherically supported sliding bearing bushing 3. The sliding bearing bushing 3 has a second end side 7 and a bearing opening 8. Correspondingly running disk 34 adjoin the end sides 7 of both sliding bearing bushings 3 and surround the armature shaft 34. The armature 33 of the electric motor 30 is connected to the running disk 34 associated with the inventive pendulum sliding bearing 2. A collector 38 of the electric motor 30 is connected with the other pendulum sliding bearing 36, for example on the running disk 34. Both the collector 38 as the armature 33 are connected non rotatably with the armature shaft 34. The armature shaft 34 is rotatably supported in both sliding bearing bushings 3. The both sliding bearing bushings 3 provide with their end sides 7 simultaneously also the possibility to support the armature 34 and the collector 38 in the axial direction, so that for wear reduction the running disks 37 are oriented toward the end sides 7.

Frequently there is an objective to support the armature 34 and its collector so that both elements can be supported as little as possible in the axial direction. It should be emphasized that between the end side 7 of the bearing bushing 3 and the running disk 37 a gap which is as small as possible must be provided, which is very expensive to guarantee only with accurate manufacture of the components. With the use of the inventive pendulum sliding bearing 2 the adjustment of such a radial gap is possible by progressive depressing of the pendulum sliding bearing 2 into the tubular projection 32. By axial movement of the armature shaft it is measured how great is an axial gap instantaneously, and correspondingly this radial gap is further reduced by further pressing-in of the pendulum sliding bearing 2 or the pressing-in process is interrupted when the axial gap is sufficiently small.

As described above, the casing fields 12, 13 and 14 are determined so that the bearing body 4 is firmly held by frictional connection in the cylindrical opening. An additional securing against axial deviation of the pendulum sliding bearing 2 is obtained by pressing-in of projections 39 and 40. The projection 39 for example engages in a depression associated with the projection 40, so that a form-locking axial securing is provided. For example the projection 39 and 40 can be arranged in all casing fields 12, 13 and 14. Thereby also a great axial loading of the pendulum sliding bearing 2 can cause no disturbing increase of the axial gap.

In contrast to the embodiment of FIG. 1, the pendulum sliding bearing 2 in FIG. 5 is provided with a ring-shaped porous storage element 41 for a lubricant supply. Such ring-shaped porous storage element 41 can be also inserted in the left pendulum sliding bearing 36.

Alternatingly to the above described axial additional securing of the pendulum sliding bearing 2 by the projection 39 and 40, there is a possibility of a self-substance securing. For this purpose for example point welding can be used, since the supporting fingers 15, 16, 17 and the tubular projection 32 are composed of metal plate. For optical reasons, a not shown point welding tool can be formed so that a finished point welding connection has the appearance of substantially the projections 39 and 40. There is therefore the advantage that practically no electrically heatable material is pressed upwardly over the circumferential surface of the tubular projection 32.

Instead of welding points, also not shown welding beads can be applied to the end sides on the casing fields 12, 13 and 14 and simultaneously on the cylindrical opening 22.

Another possibility to provide securing in addition to the friction connection is that the supporting fingers 15, 16 and 17 can be glued with a cylindrical opening 22. For this purpose a known adhesive can be utilized, which is known during projection of the electric motors of the type small electric motor for a movable roof transmission or a window wiper.

It will be understood that each of the elements described above, or two or more together, may also find a useful application in other types of constructions differing from the types described above.

While the invention has been illustrated and described as embodied in pendulum sliding bearing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pendulum sliding bearing, comprising a sliding bearing bushing provided for receiving rotatable elements, said sliding bearing bushing having calotte portions at end sides; a bearing body formed of a metal plate and having a ring-shaped abutment surface for one of said calotte portions of said sliding bearing bushing; a wall extending substantially outwardly of said abutment surface; and a casing adjoining said wall and provided for insertion in a cylindrical opening, a spring disk having a central opening and an adjoining at least one second abutment surface for said second calotte portion of said sliding bearing bushing and having a radially outer edge fixed on said bearing body, said casing being subdivided into casing fields which extend substantially parallel to a longitudinal axial of said bearing body so that gaps are available between said casing fields; a plurality of supporting fingers extending at least over a width of said gaps from said wall in a direction opposite to a course of said casing.

2. A pendulum sliding bearing as defined in claim 1, wherein said casing fields including three casing fields extending axially from said wall, said supporting fingers including three supporting fingers which are offset relative to one another by a rotary angle.

3. A pendulum sliding bearing as defined in claim 1, wherein said supporting fingers are located inside a contour circle whose diameter is smaller than a diameter of a contour circle on which said casing fields ends.

4. A pendulum sliding bearing as defined in claim 1, wherein said spring disk has a funnel-shaped projection extending toward said supporting fingers, said projection being open toward free ends of said supporting fingers and having an edge.

5. A pendulum sliding bearing as defined in claim 1, wherein at least one abutment surface of said spring disk provided for said second calotte portion is subdivided into a plurality of springy tongues which have free ends extending in an opening direction of said funnel-shaped projection.

6. A pendulum sliding bearing as defined in claim 1; and further comprising a housing component of a device provided with said cylindrical opening, said bearing body being pressed in said cylindrical opening of said housing part, at least one of said casing fields being welded with said housing part.

7. A pendulum sliding bearing as defined in claim 6, wherein said housing part extends around said casing fields of said bearing body and is formed as a tubular projection; and further comprising welding means formed as point welding.

8. A pendulum sliding bearing as defined in claim 1, wherein said cylindrical opening in which said bearing body is supported is formed as a tubular projection of a housing part of a device; and further comprising projections which are pressed flush in said tubular projection and in at least one of said casing fields.

9. A pendulum sliding bearing as defined in claim 1, wherein said casing fields of said bearing body are glued with said cylindrical opening.

* * * * *